US008862168B2

(12) United States Patent
Li et al.

(10) Patent No.: US 8,862,168 B2

(45) Date of Patent: Oct. 14, 2014

(54) BASE STATION DEVICE, METHOD THEREOF, AND COMMUNICATION SYSTEM THEREOF

(75) Inventors: Yalin Li, Shanghai (CN); Wei Cao, Shanghai (CN); Xun Fan, Shanghai (CN); Lingfeng Lin, Shanghai (CN); Chunting Li, Shanghai (CN); Yong Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 157 days.

(21) Appl. No.: 13/520,482

(22) PCT Filed: Jan. 6, 2010

(86) PCT No.: PCT/CN2010/000025

§ 371 (c)(1), (2), (4) Date: Jul. 3, 2012

(87) PCT Pub. No.: WO2011/082502

PCT Pub. Date: Jul. 14, 2011

(65) Prior Publication Data

US 2013/0157675 A1 Jun. 20, 2013

(51) Int. Cl.

*H04B 15/00* (2006.01)
*H04J 11/00* (2006.01)
*H04W 72/08* (2009.01)
*H04B 17/00* (2006.01)
*H04L 25/03* (2006.01)

(52) U.S. Cl.

CPC .......... *H04W 72/082* (2013.01); *H04B 17/005* (2013.01); *H04L 2025/0342* (2013.01); *H04B 17/0055* (2013.01); *H04J 11/0036* (2013.01); *H04L 25/03006* (2013.01); *H04L 2025/03414* (2013.01); *H04J 11/0059* (2013.01); *H04L 2025/03426* (2013.01)

USPC ......................... 455/501; 455/67.13; 370/317

(58) Field of Classification Search

USPC .......... 455/296, 63.1, 278.1, 501, 67.13, 283; 370/201, 317; 375/346, 148, 227, 254, 375/229

See application file for complete search history.

(56) References Cited

U.S. PATENT DOCUMENTS

2003/0185285 A1 10/2003 Talwar (Continued)

FOREIGN PATENT DOCUMENTS

CA 2530622 A1 1/2005

(Continued)

OTHER PUBLICATIONS

International Search Report for PCT/CN2010/000025 dated Oct. 21, 2010.

(Continued)

*Primary Examiner* — Daniel Lai

(74) *Attorney, Agent, or Firm* — Fay Sharpe LLP

(57) ABSTRACT

A base station device, method, and communication system are disclosed. The base station includes a covariance matrix obtaining unit forming a covariance matrix of an interference vector and a noise vector from received signals from multiple user equipment; a ratio calculation and comparison unit that calculates a relative ratio between the interference and the noise in the received signals based on the covariance matrix and compares the ratio with a predetermined threshold; an adjusting unit that reduces values of non-diagonal elements in the covariance matrix when the ratio is less than the predetermined threshold; an equalizer unit that performs equalization based on the covariance matrix using an Interference Rejection Combining algorithm when the ratio is greater than or equal to the predetermined threshold, and equalizes the received signals based on the adjusted covariance matrix using a Minimum Mean Square Error algorithm when the ratio is less than the predetermined threshold.

18 Claims, 3 Drawing Sheets

(56) References Cited

U.S. PATENT DOCUMENTS

| | | | | |
|---|---|---|---|---|
| 2008/0025200 | A1 * | 1/2008 | Tiirola et al. | 370/210 |
| 2008/0231500 | A1 * | 9/2008 | Heikkila et al. | 342/159 |
| 2008/0247446 | A1 | 10/2008 | Kramer et al. | |
| 2009/0149147 | A1 | 6/2009 | Jonsson et al. | |
| 2009/0161645 | A1 | 6/2009 | Wang et al. | |
| 2010/0027590 | A1 * | 2/2010 | Alebachew et al. | 375/148 |
| 2010/0157909 | A1 | 6/2010 | Miura et al. | |
| 2011/0085627 | A1 * | 4/2011 | Kangas et al. | 375/346 |

FOREIGN PATENT DOCUMENTS

| | | | |
|---|---|---|---|
| CN | 1813414 | A | 8/2006 |
| CN | 1878026 | A | 12/2006 |
| GB | 2456874 | A | 8/2009 |
| JP | 2006507710 | A | 3/2006 |
| JP | 2007318684 | A | 12/2007 |
| JP | 2011507320 | A | 3/2011 |
| WO | 03084094 | A2 | 10/2003 |

OTHER PUBLICATIONS

English Bibliography for Japanese Patent App. Publication No. JP2007318684A, published Dec. 6, 2007, printed from Thomson Innovation on Oct. 3, 2013, 4 pp.

English Bibliography for Japanese Patent App. Publication No. JP2011507320A, published Mar. 3, 2011, printed from Thomson Innovation on Oct. 3, 2013, 3 pp.

English Bibliography for Japanese Patent App. Publication No. JP2006507710A, published Mar. 2, 2006, printed from Thomson Innovation on Oct. 3, 2013, 3 pp.

* cited by examiner

BASE STATION DEVICE, METHOD THEREOF, AND COMMUNICATION SYSTEM THEREOF

TECHNICAL FIELD

Embodiments of the present invention relate to wireless communication, and particularly to a base station device, a method thereof and a communication system thereof.

BACKGROUND OF THE INVENTION

Currently, with multiple antennas equipped in a base station BS, interference from a neighboring cell can be significantly eliminate by using an Interference Rejection Combining (IRC) algorithm. However, when the interference power is relatively low, the performance of the IRC algorithm would not be so outstanding.

Meanwhile, the performance of a conventional Minimum Mean Square Error (MMSE) algorithm is far superior to that of the IRC algorithm in a low interference scenario, for example, at the central position of the serving cell.

Therefore, there is a need for developing a new receiver structure so as to adaptively switch between the MMSE and the IRC, thereby fully utilizing the advantages of the two algorithms.

SUMMARY OF THE INVENTION

An objective of the present invention is to provide a receiver device, a method thereof and a communication system thereof, such that a better performance may be achieved whether in a case of being located in the center of a serving cell or in a case of being located at the edge of the serving cell.

According to one aspect of the present invention, a base station device is provided, comprising: a covariance matrix obtaining unit that forms a covariance matrix of an interference vector and a noise vector from received signals from multiple user equipments; a ratio calculation and comparison unit that calculates a relative ratio between the interference and the noise in the received signals based on the covariance matrix and compares the ratio with a predetermined threshold; an adjusting unit that reduces values of non-diagonal elements in the covariance matrix when the ratio is less than the predetermined threshold; an equalizer unit that performs equalization based on the covariance matrix by ultilizing an Interference Rejection Combining algorithm when the ratio is greater than or equal to the predetermined threshold, and equalizes the received signals based on the adjusted covariance matrix by ultilizing an Minimum Mean Square Error algorithm when the ratio is less than the predetermined threshold.

According to the embodiments of the present invention, the ratio calculation and comparison unit calculates a power ratio between the interference and the noise in the received signals as the relative ratio.

According to the embodiments of the present invention, the ratio calculation and comparison unit calculates a sum of non-diagonal elements in the upper triangular portion of the covariance matrix of the interference vector and the noise vector divided by a sum of diagonal elements as the relative ratio.

According to the embodiments of the present invention, the adjusting unit reduces the values of the non-diagonal elements of the covariance matrix to zero when the relative ratio is less than the threshold.

According to the embodiments of the present invention, the ratio calculation and comparison unit calculates an amplitude ratio between the interference and the noise in the received signals as the relative ratio.

According to another aspect of the present invention, a method for a base station device is provided, comprising steps of: forming a covariance matrix of an interference vector and a noise vector from received signals from multiple user equipments; calculating a relative ratio between the interference and the noise in the received signals based on the covariance matrix and comparing the ratio with a predetermined threshold; reducing values of non-diagonal elements in the covariance matrix when the ratio is less than the predetermined threshold; performing equalization based on the covariance matrix by utilizing an Interference Rejection Combining algorithm when the ratio is greater than or equal to the predetermined threshold, and equalizing the received signals based on the adjusted covariance matrix by utilizing a Minimum Mean Square Error algorithm when the ratio is less than the predetermined threshold.

According to the embodiments of the present invention, a power ratio between the interference and the noise in the received signals is calculated as the relative ratio.

According to the embodiments of the present invention, a sum of non-diagonal elements in the upper triangular portion of the covariance matrix of the interference vector and the noise vector divided by a sum of diagonal elements is calculated as the relative ratio.

According to the embodiments of the present invention, values of the non-diagonal elements of the covariance matrix are reduced to zero when the relative ratio is less than the threshold.

According to the embodiments of the present invention, an amplitude ratio between the interference and the noise in the received signals is calculated as the relative ratio.

According to a further aspect of the present invention, a communication system is provided, comprising a base station device as is described above.

The above method and device are used to enable an adaptive switching between the IRC algorithm-based receiving scheme and the MMSE-based receiving scheme. For example, when the user is located in an area with a higher signal-to-interference ratio (SIR), the advantages of the IRC algorithm can be fully utilized; and when the user is located in an area with a lower signal-to-interference (SIR), the advantages of the MMSE algorithms can be fully utilized.

BRIEF DESCRIPTION OF THE DRAWINGS

The above and other objectives, features and advantages will become more apparent through the following description of the preferred embodiments of the invention with reference to the drawings, wherein.

DETAILED DESCRIPTION OF THE PREFERRED EMBODIMENTS OF THE PRESENT INVENTION

Various embodiments of the invention will be described below. The following description provides details for comprehensively understanding these embodiments. However, those skilled in the art should understand that the invention may also be implemented without some of the details. Furthermore, some well-known structures or functions may not be illustrated or specified to avoid unnecessarily causing relevant depictions on the various embodiments of the invention unclear.

Figure 1:
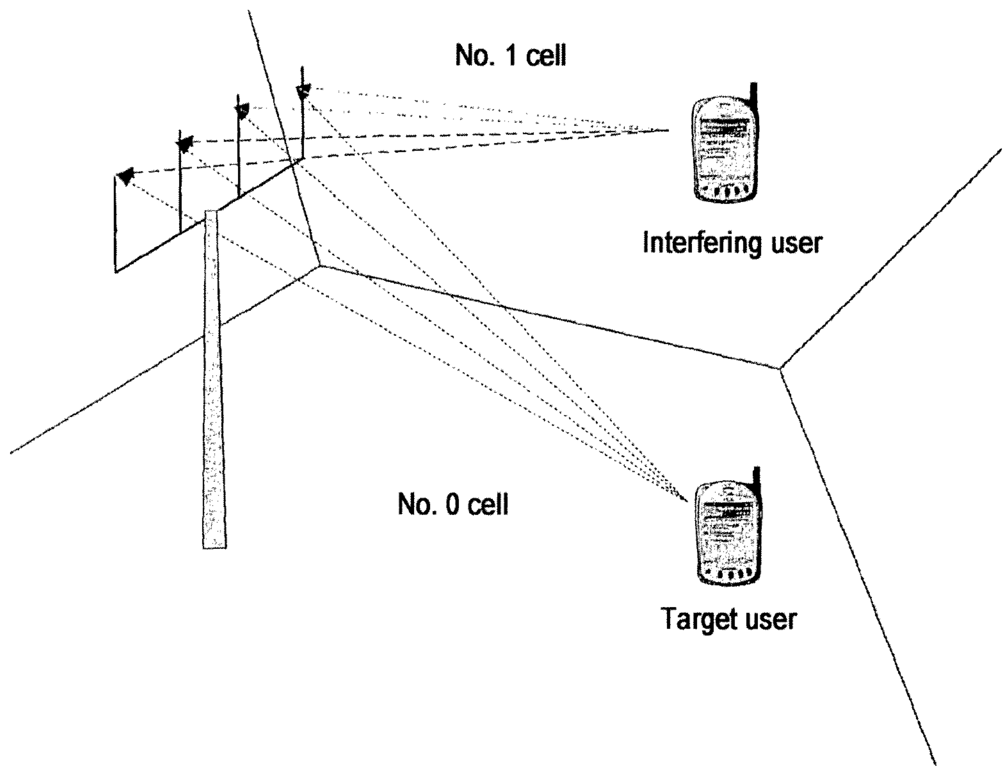
FIG. 1 illustrates a typical IRC algorithm application scenario.

As illustrated in FIG. 1, when a target MS is located at the edge of No. 0 serving cell and the interference from a mobile station MS (interfering MS) of the neighboring No. 1 cell is relatively strong, the IRC algorithm is always very effective. However, when the target MS is located in the cell center, the MMSE algorithm is relatively effective.

As is described above, because the existing receiver adopts two equalization approaches, the MMSE algorithm and the IRC algorithm have to be implemented in different functional modules, and thus a highly complex structure will be required for supporting the two algorithms in one receiver. However, the prior art cannot perform adaptive switching between the MMSE algorithm and the IRC algorithm. The highly complex structure obstructs the wide application of the IRC algorithm. Therefore, when the interfering signal has a relatively large power, for example, in the case of being located at the edge of the serving cell, the system performance has to be sacrificed.

According to the embodiments of the invention, it is determined whether to switch between the MMSE algorithm and the IRC algorithm by determining the relative ratio (for example, the ratio of the power) between the interference and the noise in received signals. In this way, whether the user equipment is present at the edge of the serving cell or in the center of the serving cell, the system throughput performance will be relatively high.

According to the embodiments of the invention, the signal r received at the base station (BS) may be represented as:

$$r=Hs+z \quad (1)$$

where, s denotes the signal from the target mobile station (MS), H denotes the channel matrix between the target MS and the BS, while z denotes the interfering signal and the noise.

On one hand, the IRC algorithm may be expressed as:

$$\hat{s}=(H^H R_z^{-1} H+1)^{-1} H^H R_z^{-1} r \quad (2)$$

where, $R_z$ denotes the covariance matrix of z in the following format:

$$R_z = \begin{bmatrix} \sigma_1^2 + a_1^2 & a_1 a_2^* & \dots & a_1 a_{N_R}^* \\ a_1^* a_2 & \sigma_2^2 + a_2^2 & \dots & a_2 a_{N_R}^* \\ \vdots & \vdots & \ddots & \vdots \\ a_1^* a_{N_R} & a_2^* a_{N_R} & \dots & \sigma_{N_R}^2 + a_{N_R}^2 \end{bmatrix} \quad (3)$$

$R_z$ is generally calculated based on the channel estimation result obtained from the pilot signal. If the main component of z is interference, the non-diagonal elements in $R_z$ will be relatively large, while the diagonal elements are relatively small. If the main component of z is noise, then $R_z$ is close to the diagonal matrix to a great extent, and the values of non-diagonal elements are close to zero.

On the other hand, the Minimum Mean Square Error (MMSE) algorithm may be expressed below:

$$\hat{s}=(H^H H+N)^{-1} H^H r \quad (4)$$

where N denotes the power matrix of the noise in the following format:

$$N = \begin{bmatrix} \sigma_1^2 & \dots & 0 \\ \vdots & \ddots & \vdots \\ 0 & \dots & \sigma_{N_R}^2 \end{bmatrix} \quad (5)$$

where $\sigma_i^2$, i=1, 2, . . . , $N_R$ denotes the noise power estimated at the $i^{th}$ antenna of the base station BS.

In the case of a lower interference power, the modulus of the non-diagonal elements is far less than the modulus of the diagonal elements. Thus, the values of non-diagonal elements may be set to zero without significant impact on the algorithm. Thus, $R_z$ becomes a diagonal matrix, while the IRC algorithm degenerates into the MMSE algorithm.

Based on such observation result, the equalization portions in the receiver according to the embodiments of the invention are uniformly expressed as:

$$\hat{s}=(H^H R_z^{-1} H+1)^{-1} H^H R_z^{-1} R \quad (6)$$

where $R_z$ is adaptively switched to thereby implement adaptive switching between the MMSE algorithm and the IRC algorithm in different scenarios in which the noise is the main component and the interference is the main component, respectively.

Figure 4:
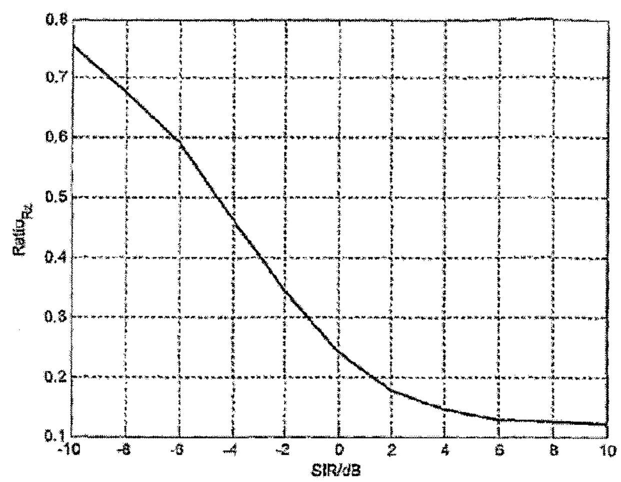
FIG. 4 illustrates a curve of a relative ratio RatioR between interference and noise in received signals with respect to the SIR.

FIG. 4 illustrates the relationship of the relative ratio $Ratio_{R_z}$ between the interference and the noise and the SIR in the case of the following configuration: BS is equipped with 4 antennas; QPSK modulation is used; the speed of MS are 3 km/h; SNR=−4 dB.

According to the embodiments of the invention, the signal-to-interference ratio is defined as:

$$SIR = \frac{\text{power of target } MS}{\text{power of interfering } MS} \quad (7)$$

Figure 5:
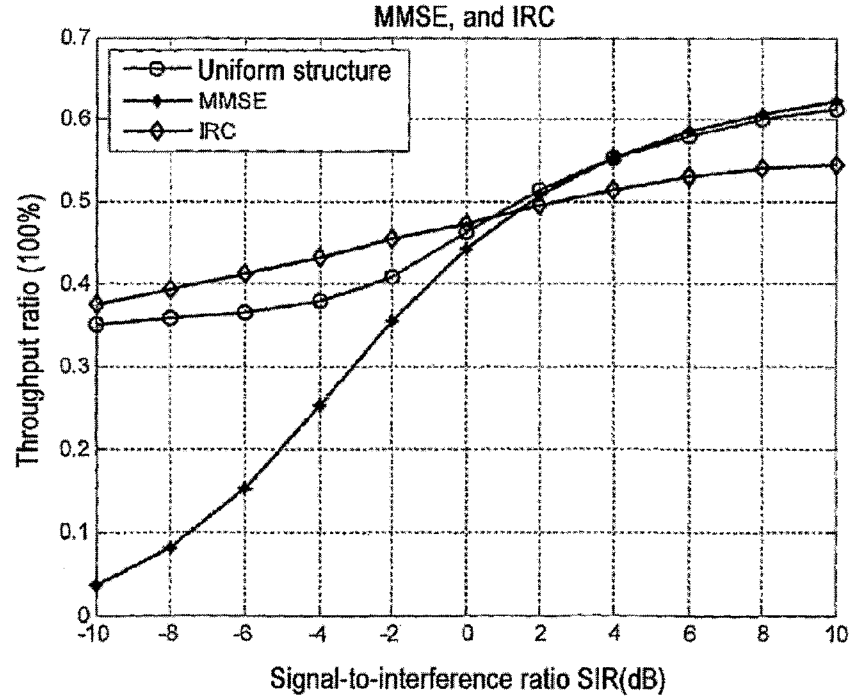
FIG. 5 illustrates performance curves of a receiver according to the embodiment of the invention, a receiver based on MMSE algorithm, and a receiver based on IRC algorithm.

If only the IRC algorithm is used, the throughput vs. SIR curve is shown in FIG. 5. If the MMSE algorithm is used alone, the throughput vs. SIR curve is shown in FIG. 5. From FIG. 5, it is seen that the IRC algorithm is superior to the MMSE algorithm in the case of low SIR, while inferior to the MMSE algorithm in the case of high SIR.

According to the embodiments of the invention, a ratio $Ratio_{R_z}$ is defined so as to perform adaptively switching between the MMSE algorithm and the IRC algorithm as below:

$$Ratio_{R_z} = \frac{\sum_{j=1}^{N_R-1} \sum_{k=j+1}^{N_R} |a_j a_k^*|}{\sum_{i=1}^{N_R} (\sigma_i^2 + a_i^2)} \quad (8)$$

The above expression is to divide the sum of the non-diagonal elements in the upper triangle portion of the above defined covariance matrix $R_z$ of the noise and the interference z by the sum of diagonal elements, namely, a metric of the relative magnitude between the interference power and the noise power in the received signal. A person skilled in the art may also employ other approaches to determine the relative ratio of the interference and the noise in the received signal.

As illustrated in FIG. 4, $\text{Ratio}_{R_z}$ decreases with the increase of SIR. According to the embodiments of the invention, the switching point may be set at threshold=0.3. Thus, when the ratio is less than 0.3, $R_z$ is used in the equalizer for the IRC algorithm. Otherwise, before equalization, all non-diagonal elements in $R_z$ are set to be zero.

Figure 2:
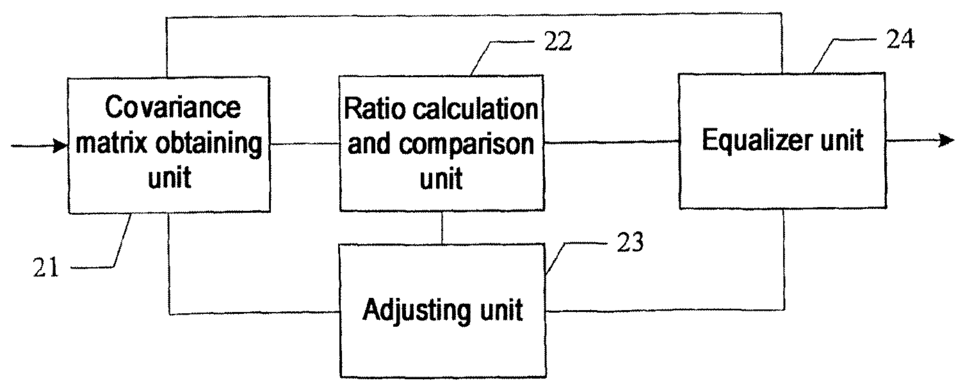
FIG. 2 illustrates a structural block diagram of a receiving device according to the embodiment of the invention.

FIG. 2 illustrates a structural diagram of a receiver according to the embodiments of the invention. As illustrated in FIG. 2, the receiver according to the embodiment of the invention comprises: a covariance matrix obtaining unit 21 that forms a covariance matrix of an interference vector and a noise vector from received signals from multiple user equipments; a ratio calculation and comparison unit 22 that calculates a relative ratio between the interference and the noise in the received signals based on the covariance matrix and compares the ratio with a predetermined threshold; an adjusting unit 23 that reduces values of non-diagonal elements in the covariance matrix when the ratio is less than the predetermined threshold, for example, reducing the values of the non-diagonal elements to for example 0; an equalizer unit 24 that performs equalization based on the IRC algorithm when the ratio is greater than or equal to the predetermined threshold, and equalizes the received signals based on the MMSE algorithm when the ratio is less than the predetermined threshold. In this way, when the user equipment moves from the center of the serving cell to the edge of the serving cell or from the edge of the serving cell to the center of the serving cell, the receiving devices of the base stations can adaptively switch between the IRC algorithm and the MMSE algorithm to enable the throughput performance of the system to maintain a higher level.

As is described above, the ratio calculation and comparison unit 22 calculates the relative ratio between noise and interference in a received signal with the above equation (8) based on the covariance matrix of the interference and noise vectors (or matrices) and compares the calculated ratio with a predetermined threshold. If the calculated ratio is less than the threshold, the adjusting unit 23 reduces the non-diagonal elements of the covariance matrix to for example 0, and then in the equalizer unit 24, the received signal is equalized with the MMSE algorithm based on the adjusted covariance matrix. If the calculated ratio is less than the threshold, no adjustment is performed to the covariance matrix, but the received signal is directly equalized in the equalizer unit 24 with the IRC algorithm based on the unadjusted covariance matrix.

Figure 3:
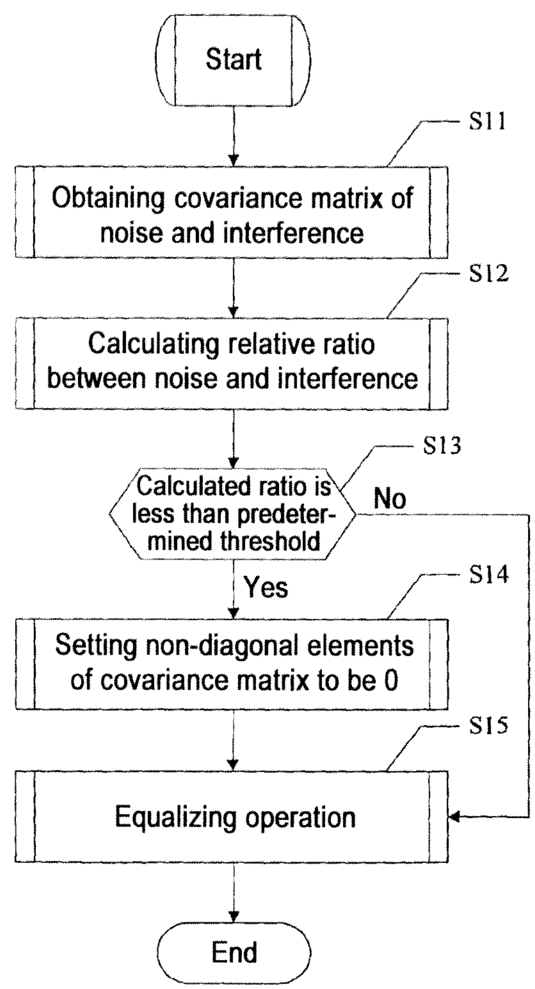
FIG. 3 illustrates a flow chart of a method according to the embodiment of the invention.

The operation process of the base station according to the embodiments of the invention will be described in detail with reference to FIG. 3 below. As illustrated in FIG. 3, at step S11, the covariance matrix obtaining unit 21 determines the vector of the interference component and the vector of the noise component from the received signals and calculates the covariance matrix of the interference vector and the noise vector.

Then, at step S12, the ratio calculation and comparison unit 22 calculates a relative ratio between the interference and noise with the above equation (8) based on the covariance matrix, for example, the relative ratio between their powers. According to another embodiment of the invention, the relative ratio between the amplitudes of the interference and the noise in the received signals may also be calculated.

Next, at step S13, the ratio calculation and comparison unit 22 compares the calculated ratio with a predetermined threshold, for example, 0.3.

If the calculated ratio is less than the predetermined threshold, at step S14, the adjusting unit 23 reduces the non-diagonal elements of the covariance matrix to 0. At step S15, the equalizer unit 24 equalizes the received signals with the MMSE algorithm based on the adjusted covariance matrix.

If the calculated ratio is greater than or equal to the predetermined threshold, at step S14, the received signals are directly equalized in the equalizer unit 24 with the IRC algorithm based on the covariance matrix.

By using the uniform receiver structure according to the embodiments of the invention, the performance in the case of low SIR is far better than the performance of the MMSE equalizer and close to the performance of the IRC equalizer; meanwhile, in the case of high SIR, the performance is similar to the MMSE performance, but better than the IRC equalizer. FIG. 5 illustrated the performance comparison results.

In the existence of interference signals from other cells, the solution according to the embodiments of the invention is more robust. By using the uniform receiver architecture according to the embodiments of the invention, the advantages of the two algorithms are achieved in a simple structure, and further, its performance is superior to a MMSE receiver and an IRC receiver.

Additionally, the uniform receiver architecture according to embodiments of the invention may be applied to an MU-MIMO communication system.

The solution of the embodiments of the invention may be applied to WiMAX, LTE (Long-Term Evolution) and LTE-Advanced.

Although the base station provided according to the embodiments of the present invention is described in the form of separate functional modules, each component illustrated in FIG. 2 and FIG. 3 may be implemented using a plurality of devices in practical application, and the plurality of components as illustrated may also be integrated on a chip or a device in practical application. A person skilled in the art should understand that the base station in the embodiments of the present invention may also include any unit or means for other purposes.

Those skilled in the art should easily understand that different steps of the above method may be implemented through a programmed computer. Here, some embodiments also include a machine-readable or computer-readable program storage device (for example, a digital data storage medium) and an encoding machine-executable or computer-executable program instruction, wherein the instruction performs some or all steps of the above method. For example, the program storage device may be a digital memory, a magnetic storage medium (a magnetic disk or tape), hardware or optical readable digital storage medium. The embodiments likewise include a programmed computer for performing the steps of the above method.

The description and drawings merely illustrate the principle of the invention. Therefore, it should be understood that those skilled in the art may suggest different structures. Although these different structures are not explicitly described or illustrated herein, they embody the principle of the present invention and are included within the spirit and scope of the present invention. Furthermore, the examples as provided herein are mainly intended expressly to be only for pedagogical purposes to aid readers in understanding the principle of the invention and the concept contributed by these inventors to furthering the art, and they should be construed as being without limitation to such specifically recited examples and conditions. Moreover, all statements herein reciting principle, aspects and embodiments of the invention, as well as specific examples thereof, encompass equivalents thereof.

What is claimed is:

1. A receiving device for a base station of a wireless communication system, comprising:

a covariance matrix obtaining unit configured to form an initial covariance matrix of an interference vector and a noise vector based on received signals from multiple user equipment;

a ratio calculation and comparison unit configured to calculate a relative ratio between interference and noise elements of the received signals based on the initial covariance matrix and configured to compare the relative ratio with a predetermined threshold;

an adjusting unit configured to reduce values of non-diagonal elements in the initial covariance matrix to form an adjusted covariance matrix when the relative ratio is less than the predetermined threshold; and an equalizer unit configured to adaptively switch an equalization algorithm between an Interference Rejection Combining (IRC) algorithm and a Minimum Mean Square Error (MMSE) algorithm such that the received signals are equalized based on the initial covariance matrix using the IRC algorithm when the relative ratio is greater than or equal to the predetermined threshold and the received signals are equalized based on the adjusted covariance matrix using the MMSE algorithm when the relative ratio is less than the predetermined threshold.

2. The receiving device according to claim 1, wherein the ratio calculation and comparison unit is configured to calculate a power ratio between the interference and noise elements of the received signals as the relative ratio.

3. The receiving device according to claim 1, wherein the ratio calculation and comparison unit is configured to calculate a sum of non-diagonal elements in an upper triangular portion of the initial covariance matrix divided by a sum of diagonal elements of the initial covariance matrix as the relative ratio.

4. The receiving device according to claim 1, wherein the adjusting unit is configured to reduce the values of the non-diagonal elements of the initial covariance matrix to zero in conjunction with forming the adjusted covariance matrix.

5. The receiving device according to claim 1, wherein the ratio calculation and comparison unit is configured to calculate an amplitude ratio between the interference and noise elements of the received signals as the relative ratio.

6. The receiving device according to claim 1, wherein the equalizer unit is configured to adaptively switch the equalization algorithm to use the IRC algorithm when the interference elements of the received signals are a main component of the initial covariance matrix and to use the MMSE algorithm when the noise elements of the received signals are a main component of the initial covariance matrix.

7. A method for improving reception at a wireless receiving device, comprising:

forming an initial covariance matrix of an interference vector and a noise vector at a receiving device of a base station in a wireless communication system based on received signals from multiple user equipment;

calculating a relative ratio between interference and noise elements of the received signals based on the initial covariance matrix and comparing the relative ratio with a predetermined threshold;

reducing values of non-diagonal elements in the initial covariance matrix to form an adjusted covariance matrix when the relative ratio is less than the predetermined threshold; and adaptively switching an equalization algorithm used by the receiving device between an Interference Rejection Combining (IRC) algorithm and a Minimum Mean Square Error (MMSE) algorithm such that the received signals are equalized based on the initial covariance matrix using the IRC algorithm when the relative ratio is greater than or equal to the predetermined threshold and the received signals are equalized based on the adjusted covariance matrix using the MMSE algorithm when the relative ratio is less than the predetermined threshold.

8. The method according to claim 7, further comprising:

calculating a power ratio between the interference and noise elements of the received signals as the relative ratio.

9. The method according to claim 7, further comprising:

calculating a sum of non-diagonal elements in an upper triangular portion of the initial covariance matrix divided by a sum of diagonal elements of the initial covariance matrix as the relative ratio.

10. The method according to claim 7, further comprising:

reducing the values of the non-diagonal elements of the initial covariance matrix to zero in conjunction with forming the adjusted covariance matrix.

11. The method according to claim 7, further comprising:

calculating an amplitude ratio between the interference and noise elements of the received signals as the relative ratio.

12. The method according to claim 7, wherein the equalization algorithm is adaptively switched to use the IRC algorithm when the interference elements of the received signals are a main component of the initial covariance matrix and adaptively switched to use the MMSE algorithm when the noise elements of the received signals are a main component of the initial covariance matrix.

13. A base station for a wireless communication system, comprising:

at least one receiving device for improving reception at the base station the at least one receiving device including:

a covariance matrix obtaining unit configured to form an initial covariance matrix of an interference vector and a noise vector based on received signals from multiple user equipment;

a ratio calculation and comparison unit configured to calculate a relative ratio between interference and noise elements of the received signals based on the initial covariance matrix and configured to compare the relative ratio with a predetermined threshold;

an adjusting unit configured to reduce values of non-diagonal elements in the initial covariance matrix to form an adjusted covariance matrix when the relative ratio is less than the predetermined threshold; and an equalizer unit configured to adaptively switch an equalization algorithm between an Interference Rejection Combining (IRC) algorithm and a Minimum Mean Square Error (MMSE) algorithm such that the received signals are equalized based on the initial covariance matrix using the IRC algorithm when the relative ratio is greater than or equal to the predetermined threshold and the received signals are equalized based on the adjusted covariance matrix using the MMSE algorithm when the relative ratio is less than the predetermined threshold.

14. The base station according to claim 13, wherein the ratio calculation and comparison unit is configured to calculate a power ratio between the interference and noise elements of the received signals as the relative ratio.

15. The base station according to claim 13, wherein the ratio calculation and comparison unit is configured to calculate a sum of non-diagonal elements in an upper triangular portion of the initial covariance matrix divided by a sum of diagonal elements of the initial covariance matrix as the relative ratio.

16. The base station according to claim 13, wherein the adjusting unit is configured to reduce the values of the non-diagonal elements of the initial covariance matrix to zero in conjunction with forming the adjusted covariance matrix.

17. The base station according to claim 13, wherein the ratio calculation and comparison unit is configured to calculate an amplitude ratio between the interference and noise elements of the received signals as the relative ratio.

18. The base station according to claim 13, wherein the equalizer unit is configured to adaptively switch the equalization algorithm to use the IRC algorithm when the interference elements of the received signals are a main component of the initial covariance matrix and to use the MMSE algorithm when the noise elements of the received signals are a main component of the initial covariance matrix.

* * * * *